United States Patent [19]

Gladish et al.

[11] Patent Number: 5,086,908
[45] Date of Patent: Feb. 11, 1992

[54] APPARATUS FOR MOVING BINS SIMULTANEOUSLY IN ARCUATE AND LINEAR PATHS

[75] Inventors: Herbert E. Gladish, Ottawa; Christopher L. Raiskums, Etobicoke, both of Canada

[73] Assignee: E.B. Eddy Forest Products Ltd., Ontario, Canada

[21] Appl. No.: 634,480

[22] Filed: Dec. 27, 1990

[51] Int. Cl.$^5$ ............... B65G 15/58; B65B 21/02
[52] U.S. Cl. .................... 198/468.6; 414/421; 74/105
[58] Field of Search ............ 414/403, 408, 919, 421, 414/594, 602, 229, 233–234, 247, 249; 74/104, 105; 198/468.6

[56] References Cited

U.S. PATENT DOCUMENTS

| | | | |
|---|---|---|---|
| 1,245,947 | 11/1917 | Mueller | 414/594 |
| 1,279,748 | 9/1918 | Newhouse | 414/602 |
| 2,392,557 | 1/1946 | Smith et al. | |
| 2,872,058 | 2/1959 | Doepke et al. | 414/421 |
| 2,941,681 | 6/1960 | Reyes | |
| 3,448,870 | 6/1969 | Gallo et al. | |
| 4,278,385 | 7/1981 | Bardenhagen et al. | 414/419 |
| 4,550,806 | 11/1985 | Bocker | |
| 4,550,807 | 11/1985 | Ohlgren | |
| 4,750,605 | 6/1988 | Brems et al. | 198/468.8 |
| 4,756,401 | 7/1988 | Kempton | 198/468.6 |
| 5,033,929 | 7/1991 | Marti | 414/421 |

Primary Examiner—Joseph F. Peters, Jr.
Assistant Examiner—R. B. Johnson
Attorney, Agent, or Firm—Jones, Tullar & Cooper

[57] ABSTRACT

Apparatus for moving two individual bins between their separate loading stations and a common unloading station includes a length of conveyor on which one bin always rests and a set of pivotable lever arms, the other bin being connected to one end of one set of lever arms. Another set of lever arms is connected to the first lever arms and carries cam followers which are constrained to simultaneously follow two sets of cam tracks, one of which is stationary within the apparatus and the other of which is affixed to the one bin. When a bin at the unloading station is empty the apparatus will move that bin to its own loading station while bringing the other bin from its loading station to the unloading station. Interaction between the cam followers and the cam tracks moves the one bin back or forth on the conveyor while the other bin member is moved in a vertically arcuate path. The loading station of the other bin is vertically spaced above the loading station of the one bin.

4 Claims, 3 Drawing Sheets

APPARATUS FOR MOVING BINS SIMULTANEOUSLY IN ARCUATE AND LINEAR PATHS

This invention relates to a system for manipulating bins in a warehouse or assembly facility where it is necessary to have a first supply of parts available for use while a second supply of parts is being used or consumed.

BACKGROUND OF THE INVENTION

Many factories operate on the "just-in-time" principle which means that component parts are delivered to an assembly area only when they are needed. Normally there will be minimal staging of parts waiting to be used. This principle is efficient in its use of factory space but it can cause substantial problems if there is any breakdown in the supply pipeline.

The "just-in-time" principle depends on a proper staging of parts from the manufacturer to the assembly area, whether the manufacturer be an outside supplier or just another area of the factory. In some instances it is desirable to have a small supply of parts waiting for transfer to a "pick" area, being an area where one or more operators will attend to pick up parts to be used in an assembly operation. In order to maintain a proper flow it is essential that a new supply of parts be transferred to the pick area as soon as the old supply of parts is depleted.

Parts for assembly operations are usually provided on pallets or in large bins. If the parts are heavy the pallets or bins must be moved by fork lift trucks or other similar powered pallet or bin movers. This can pose a timing or scheduling problem; also there must be someone on call to drive a fork lift truck to transfer a new pallet or bin to the pick area.

It would be desirable to be able to provide a first supply of parts to a pick area with a second supply waiting, or "staged" so that with a push of a button the second supply could be automatically brought to the pick area. A new supply could then be brought to the staging area at any time during the period in which parts are being taken from the second supply. Safety and scheduling aspects of the operation would be improved and there would be more flexibility in the usage of available manpower.

SUMMARY OF THE INVENTION

The present invention solves the problems enumerated above. It provides apparatus that has a pair of bins therein, each of which is movable along its own path, between a loading station therefor and an unloading station therefor. The two unloading stations coincide but the two loading stations are separated from each other in a vertical direction so as to conserve floor space. While one of the bins is at the unloading station the other bin can be loaded with parts. When the one bin is empty the apparatus is activated to move the empty bin to its loading station and to simultaneously move the full bin to the common unloading station. The empty bin will be replenished while the full bin is being depleted of its parts so that the apparatus can be cycled again when the bin at the unloading station is finally empty. The bins can be constructed so as to be able to receive pallets or other bins from a fork lift truck, individual parts or a plurality of parts.

One of the bins used in the apparatus will move back and forth on a floor-mounted conveyor, its loading station being at one end of the conveyor and the common unloading station being at the other end of the conveyor. The other bin is connected to suitable lever arms which will move the other bin in an arcuate path between the common unloading station and an elevated loading station generally vertically spaced above the one end of the conveyor. A fork lift truck can be used to place a pallet load of parts in either of the bins when it is at its own loading station.

The bin on the conveyor has a vertical cam track on each side thereof; the apparatus has a hockey-stick shaped cam track on each side thereof; and a cam follower on each side of the apparatus simultaneously engages each of the cam tracks. The cam follower is connected via a second lever arm to the first-mentioned lever arm so that as the first lever arms move the other bin in its arcuate path the second lever arms will move, the cam followers being constrained by the cam tracks, to force the one bin to move along the conveyor at the same time.

Generally speaking therefore, the present invention may be considered as providing apparatus for selectively moving first and second bin members between individual loading stations and a common unloading station, comprising: conveyor means extending through the system, the second bin member being adapted for reciprocal movement thereon between its loading station and the unloading station; frame means on each side of the conveyor means; a pair of elongated first lever arms pivotally mounted between the ends thereof in the frame means with the first bin member being pivotally connected to the first lever arms at a distal end thereof; a pair of elongated second lever arms, each being pivotally connected at one end thereof to the proximal end of a respective first lever arm; a pair of first cam tracks, one on each side of the conveyor means and each including an angled portion and a straight portion extending forwardly along the conveyor means; a pair of second cam tracks, each extending vertically on a respective side of the second bin member; a cam follower at the other end of each the second lever arm and constrained to simultaneously engage the corresponding first and second cam tracks; and drive means connected between the frame means and each of the first lever arms; whereby, with the second bin member at its loading station and the first bin member at the common unloading station the drive means are in a first condition and each the cam follower is at the upper extremity of the respective first and second cam tracks, subsequent operation of the drive means to a second condition thereof serving to pivot the first lever arms to lift and move the first bin member from the common unloading station to its loading station, such pivoting movement of the first lever arms serving to move the second lever arms and the cam followers along a path defined by the first cam tracks, the cam followers simultaneously moving, through engagement with the second cam tracks, the second bin member from its loading station, along the conveyor means, to the common unloading station.

DESCRIPTION OF THE PREFERRED EMBODIMENT

Figure 1:
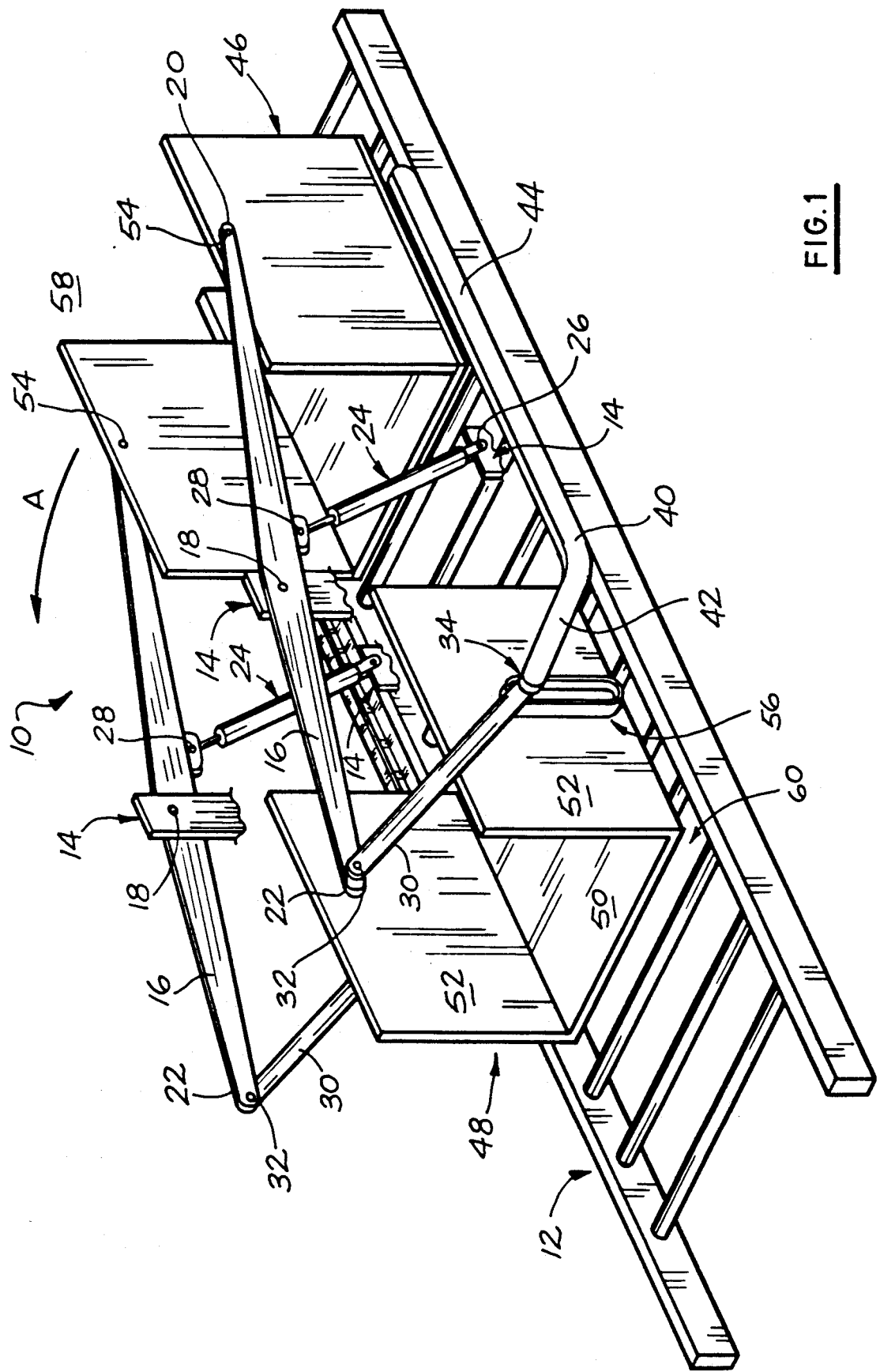
FIG. 1 shows a perspective view of the apparatus of the present invention.

The apparatus of this invention is generally designated by the reference number 10. It will be seen that a length of conveyor 12 extends through the apparatus from one end to the other. The conveyor 12 may be a conventional roller conveyor as shown or it could be a ball conveyor or any other conventional conveyor. It could also entail a pair of elongated transversely concave air bearing rails as part of a SAILRAIL (trademark) air conveyor system.

On each side of the conveyor 12 there is provided a frame 14 which can take any configuration as long as it provides adequate support for the various components to be mounted thereon. In particular a first lever arm 16 is pivotally mounted to each frame 14, the pivot mounting 18 being intermediate the distal and proximal ends 20, 22 respectively of the lever arm 16. There is also mounted in each frame 14 drive means 24 preferably in the form of a hydraulic piston and cylinder unit, pivotally connected at one end 26 to the frame 14 and at the other end 28 to the first lever arm 16 intermediate the distal end 20 and the pivot mounting 18.

Figure 4:
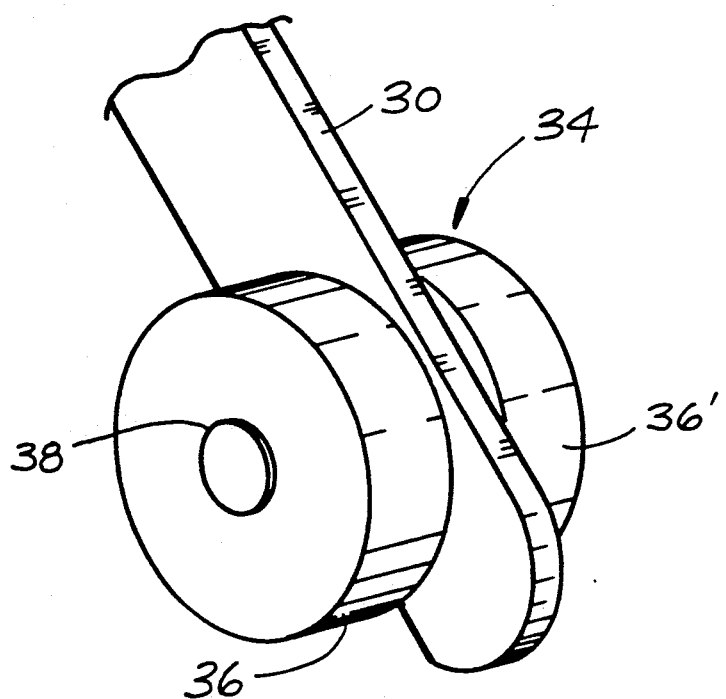
FIG. 4 shows a perspective view of the cam follower on the second lever arm.

The proximal end 22 of each lever arm 16 is pivotally connected to one end of a second lever arm 30, as at 32. The other end of the lever arm 30 carries a cam follower 34 which in FIG. 4 is seen to comprise a pair of wheels 36, 36' bearingly mounted for independent rotation on a transverse axle 38, there being one wheel on each side of the arm 30.

A cam track 40, generally in the shape of a hockey stick is provided on each side of the conveyor 12 in the frame 14. The cam track includes an angled portion 42 which slopes downwardly and forwardly from an upper end thereof to a straight portion 44 which extends forwardly alongside the conveyor 12. The cam track 40 is shaped so that it can contain the cam wheel 36 and constrain it to follow a path defined thereby.

The apparatus of this invention uses a first bin 46 and a second bin 48 both being essentially the same as far as the overall configuration and load-carrying capacity thereof is concerned. One typical configuration will see each bin with a flat reinforced floor 50 and vertical end walls 52. The front, top and rear areas of the bin are open so that a palletized load can be easily inserted or removed from the bin. Other bin configurations could be used, depending on the form of load to be carried thereby.

The first bin 46 is pivotally attached to the distal end 20 of the first arms 16 as by journal bearings at 54. The strength of the pivot mounting must be sufficient to support a fully loaded bin suspended by the arms 16 above the factory floor.

The second bin 48 always rides on the conveyor 12. If SAILRAIL rails are used for the conveyor then the bin 48 would be mounted on suitable SAILRAIL runners for cooperative movement along the rails. Each end wall 52 of the bin 48 carries a vertically extending second cam track 56 which projects from the side wall and is generally obround in configuration. Each cam track 56 is adapted to contain the other cam wheel 36', simultaneously with the cam wheel 36 being contained in the first cam track 40.

FIG. 1 shows the bins 46, 48 in a first position with bin 46 being located at the common unloading station 58, the drive means 24 being in a first condition (retracted), and the cam wheels 36, 36' engaging the cam tracks 40, 56 respectively so as to be at the upper extremity of each. A load in the bin 46 is progressively used and during such usage a new load has been positioned in the bin 48, resting on the conveyor 12 at the loading station 60 of the bin 48.

Figure 2:
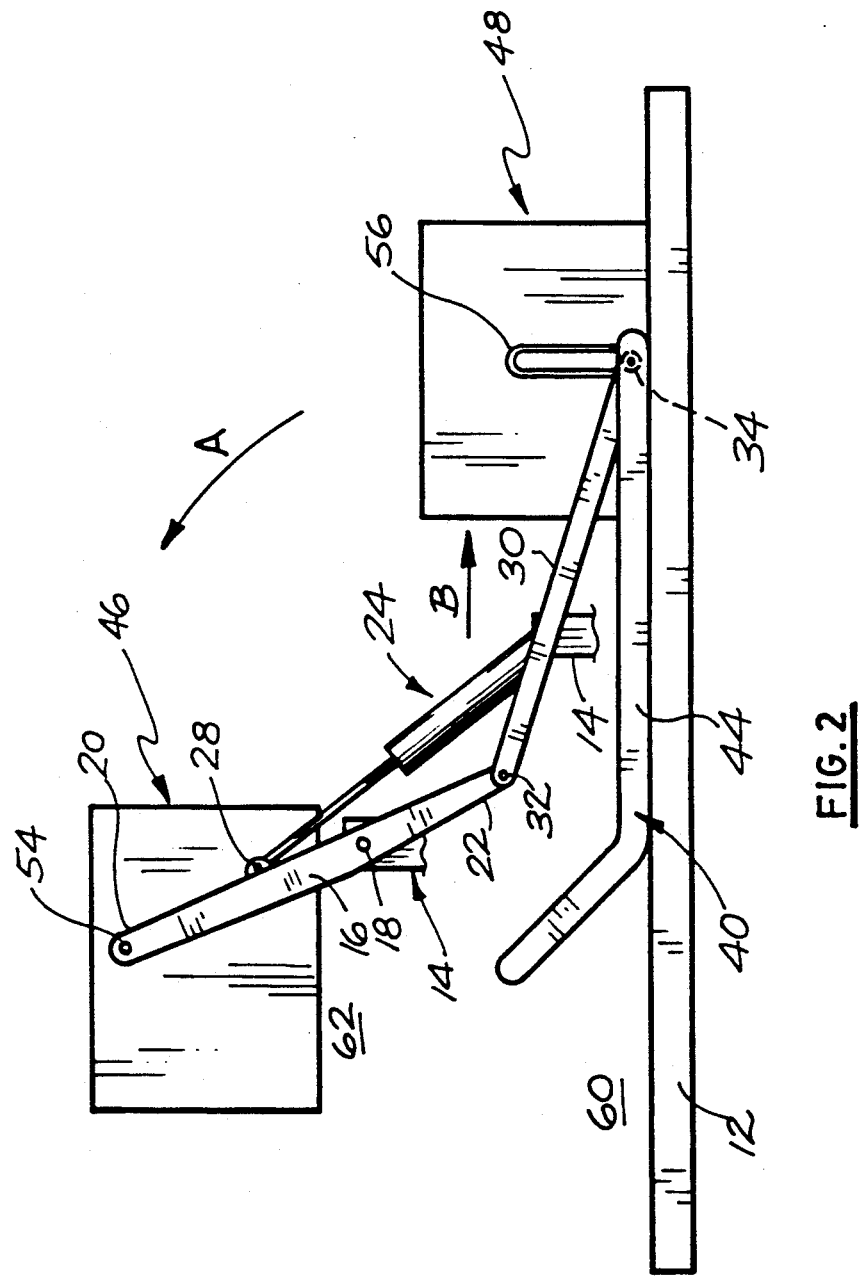
FIG. 2 shows a side view of the apparatus.
Figure 3:
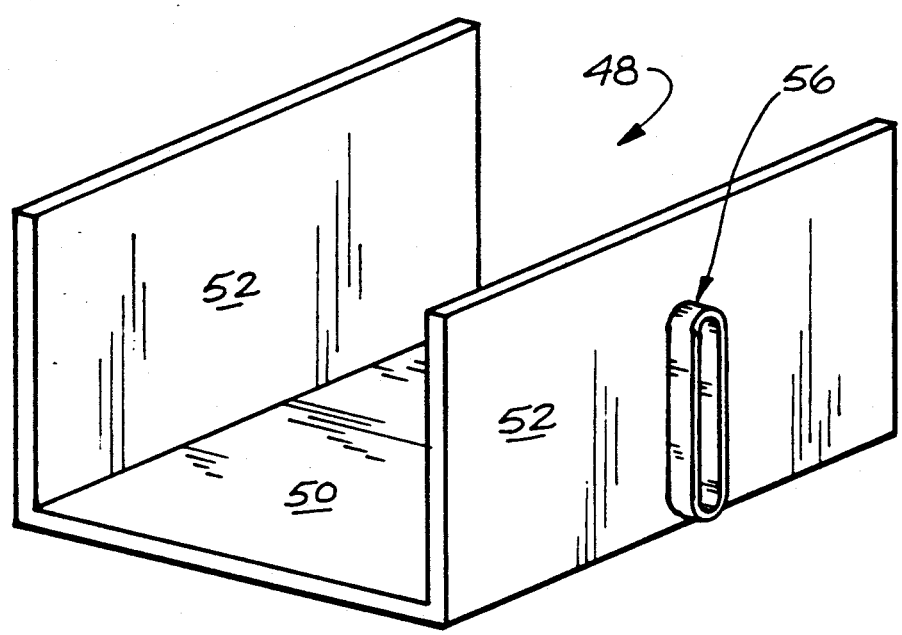
FIG. 3 shows a perspective view of a suitable second bin member.

When the load in bin 46 has been exhausted an operator can merely push a button to activate the drive means 24 causing it to extend towards a second position thereof, as shown in FIG. 2. As the drive means 24 extends, the lever arm 16 is forced to rotate on its pivot mounting 18, thereby lifting the empty bin 46 from the unloading station 58 and moving it in an arcuate path (arrow A) to its own elevated loading station 62 above the loading station 60. The bin 46 can be replenished with parts while it is at its loading station 62.

Simultaneously with the arcuate lifting of the bin 46 the pivoting lever arm 16 causes the lever arm 30 to move downwardly and forwardly (arrow B), the path of movement being constrained by engagement of cam wheel 36 in the angled portion 42 of the cam track 40. As the cam wheel 36 moves downwardly and forwardly in the cam track portion 42 the other cam wheel 36' descends in the cam track 56 on the second bin 48. Because the cam wheels are also moving forwardly the bin 48 must follow and hence it moves forwardly on conveyor 12 from its loading position 60 towards the common unloading position 58. Once the cam wheel 36 meets the straight cam track portion 44 the other cam wheel 36' will be the bottom of the cam track 56. Continued extension of the drive means 24 causes the cam wheels 36, 36' to move forwardly until the drive means 24 reaches its second condition which coincides with the first bin 46 being at its loading station 62 and the second bin 48 being at the common unloading station 58.

Once the second bin 48 has been unloaded the entire operation is reversed. Activation of the drive means 24 moves the first bin 46 arcuately from its loading station 62 to the common unloading station 58 and simultaneously the second (now empty) bin 48 is moved backward from the unloading station to its own loading station 60.

With the present invention the empty bin can be reloaded with parts or goods while the full bin is being emptied. Replenishment of an empty bin takes place remotely from the prime work area and it can be accomplished at any time during the normal work cycle. Efficiency of the operation is increased through improved staging and hence better scheduling, and there is less danger of injury from lift trucks moving in the vicinity of the work area.

Although a preferred form of the invention has been disclosed it is clear that a skilled workman could alter the specific details of the structure without departing from the spirit of the invention. The protection to be afforded this invention is to be determined from the scope of the claims appended hereto.

We claim:

1. Apparatus for selectively moving first and second bin members between their respective loading stations and a common unloading station, comprising:
   a) conveyor means extending between the loading station of at least one of said bins and said common unloading station, said second bin member being adapted for reciprocal movement thereon between its loading station and said unloading station;

b) frame means on each side of said conveyor means;
c) a pair of elongated first lever arms pivotally mounted between the ends thereof in said frame means with said first bin member being pivotally connected to said first lever arms at a distal end thereof;
d) a pair of elongated second lever arms, each being pivotally connected at one end thereof to the proximal end of a respective first lever arm;
e) a pair of first cam tracks, one on each side of said conveyor means and each including a first straight portion extending substantially parallel to said conveyors means and a second portion disposed at an angle relative to said first straight portion;
f) a pair of second cam tracks, each extending vertically on a respective side of said second bin member;
g) a cam follower at the other end of each said second lever arm and constrained to simultaneously engage the corresponding first and second cam tracks; and
h) drive means connected between said frame means and each of said first lever arms for pivoting said first lever arms;
i) whereby, with said second bin member at its loading station and said first bin member at the common unloading station said drive means are in a first condition and each said cam follower is at the upper extremity of the respective first and second cam tracks, subsequent operation of said drive means to a second condition thereof serving to pivot said first lever arms to lift and move said first bin member from the common unloading station to its loading station, such pivoting movement of said first lever arms serving to move said second lever arms and said cam followers along a path defined by said first cam tracks, said cam followers simultaneously moving, through engagement with said second cam tracks, said second bin member from its loading station, along said conveyor means, to the common unloading station.

2. Apparatus according to claim 1 wherein said drive means is a hydraulic piston and cylinder unit with one end being pivotally connected to said frame means and the other end being pivotally connected to said first lever arm.

3. Apparatus according to claim 1 wherein said second bin member always rests on said conveyor means.

4. Apparatus according to claim 1 wherein said cam follower includes first and second cam wheels independently mounted for rotation on a common axle, one cam wheel being on one side of said second lever arm and engaging said first cam track, the other cam wheel being on the other side of said second lever arm and simultaneously engaging said second cam track.

* * * * *